(12) United States Patent
Parker et al.

(10) Patent No.: US 7,937,663 B2
(45) Date of Patent: May 3, 2011

(54) INTEGRATED COLLABORATIVE USER INTERFACE FOR A DOCUMENT EDITOR PROGRAM

(75) Inventors: Jared R. Parker, Bothell, WA (US); Sangya Singh, Bellevue, WA (US); Greg Prickril, Bethany, OK (US); Wai Chan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 828 days.

(21) Appl. No.: 11/824,560

(22) Filed: Jun. 29, 2007

(65) Prior Publication Data

US 2009/0006948 A1 Jan. 1, 2009

(51) Int. Cl.
*G06F 3/00* (2006.01)
(52) U.S. Cl. ........................................ 715/751; 715/753
(58) Field of Classification Search .................. 715/751, 715/753; 709/205, 207, 224
See application file for complete search history.

(56) References Cited

U.S. PATENT DOCUMENTS

| | | | |
|---|---|---|---|
| 5,671,428 A * | 9/1997 | Muranaga et al. ............ | 715/751 |
| 6,055,551 A | 4/2000 | Heinlein | |
| 6,088,702 A | 7/2000 | Plantz | |
| 6,199,116 B1 | 3/2001 | May | |
| 6,446,093 B2 | 9/2002 | Tabuchi | |
| 6,601,087 B1 | 7/2003 | Zhu | |
| 7,139,800 B2 | 11/2006 | Bellotti et al. ................ | 709/206 |
| 7,191,410 B1 | 3/2007 | Kruempelmann et al. ... | 715/853 |
| 7,577,906 B2 * | 8/2009 | Friedrichowitz et al. ..... | 715/246 |
| 7,689,921 B2 * | 3/2010 | Rajarajan et al. ............ | 715/744 |
| 2004/0024890 A1 * | 2/2004 | Baek et al. .................... | 709/229 |
| 2004/0085354 A1 | 5/2004 | Massand | |
| 2006/0069599 A1 * | 3/2006 | Hatoun et al. .................... | 705/8 |
| 2006/0080432 A1 | 4/2006 | Spataro | |
| 2006/0101321 A1 * | 5/2006 | Friedrichowitz et al. ..... | 715/500 |
| 2006/0136837 A1 | 6/2006 | Ben-Shachar | |
| 2006/0248144 A1 * | 11/2006 | Zhu et al. ...................... | 709/205 |
| 2007/0016650 A1 | 1/2007 | Gilbert | |
| 2007/0118598 A1 * | 5/2007 | Bedi et al. ...................... | 709/204 |

FOREIGN PATENT DOCUMENTS

EP 1 462 951 4/2003

OTHER PUBLICATIONS

Bordin Sapsomboon, et al., "Software to Aid Collaboration: Focus on Collaborative Authoring", dated Jan. 31, 1997 (http://www.sis.pitt.edu/~spring/cas/cas.html).
E James Whitehead, Jr., et al., "WebDAV: A Network Protocol for Remote Collaborative Authoring on the Web", dated Apr. 21, 1999 (http://www.ics.uci.edu/~ejw/papers/dav-ecscw.pdf).
C. Plessl "Collaborative Authoring of Scientific Papers", dated Jan. 1, 2007 (http://plesslweb.ch/2007/01/01/collaborative-authoring-of-scientific-papers-introduction/).
International Search Report mailed Oct. 31, 2008, in PCT/US2008/065476.

* cited by examiner

*Primary Examiner* — Weilun Lo
*Assistant Examiner* — Shashi K Becker
(74) *Attorney, Agent, or Firm* — Merchant & Gould

(57) ABSTRACT

An integrated collaborative user interface for a document editor is provided. The integrated collaborative user interface includes a document pane, document details pane and a section details pane. Document details and section details are obtained and provided to authors. A collaborative author views the document details, section details and provides updates to a document in the document editor. Changes are then refreshed to the authors to provide a consistent and up-to-date status of the document.

20 Claims, 17 Drawing Sheets

INTEGRATED COLLABORATIVE USER INTERFACE FOR A DOCUMENT EDITOR PROGRAM

Document authoring projects may require multiple authors each working from separate computing stations. One author may prepare a first portion of the document and another author may prepare another portion of the document. The portions are then spliced together by an editor to form a single document. This type of collaborative authoring may include each of the authors checking-out a document to add content and checking-in a document when changes are complete. The checking-out and checking-in process may cause conflicts, restrict document availability for the authors, and cause document status confusion.

In other situations, drafts of documents are circulated by email and cause excessive versioning. Commenting format does not exist in emails, so an author may include comments in the email, add comments to an attached document, comment through highlighting, or simply make changes without identifying what has been changed. Such emailing of drafts causes excessive circulation, tracking issues, lost drafts, mismanagement, and loss of productivity.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter.

Aspects of the disclosure pertain to an integrated collaborative user interface for a document editor program. The integrated collaborative user interface includes a document pane, document details pane and a section details pane. Document details and section details are obtained and provided to authors. An author views the document details, views the section details and provides updates to a document in the document editor program. Changes are then refreshed to provide a consistent and up-to-date status of the document.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments described herein are referred to alternatively as operations, steps or modules.

Aspects of the disclosure pertain to an integrated collaborative user interface for a document editor program. A document editor program is provided that includes a collaborative user interface integrated with the document editor program. The collaborative user interface may be accessed from a ribbon tab. The collaborative user interface includes a document pane where an author or editor may generate a document. The collaborative user interface may also include a document assembly pane. The document assembly pane includes document details and section details. The document details pane may include the owner of the document, the filename of the document, and an abstract of the document. The section details include various sections of the document along with the author assigned to the section. The section details may be expanded to ascertain the status of each of the sections. Upon refreshing the document, the sections are updated with the most current content and status from the authors. As such, author and editors are provided a seamless user experience during collaboration with the document editor program. Multiple authors may edit the contents of different sections of the same document at the same time. Efficiency is increased because the status and content are updated upon refresh. Authors and editors may easily view the entirety of the document even when the document is in a draft state.

Figure 1:
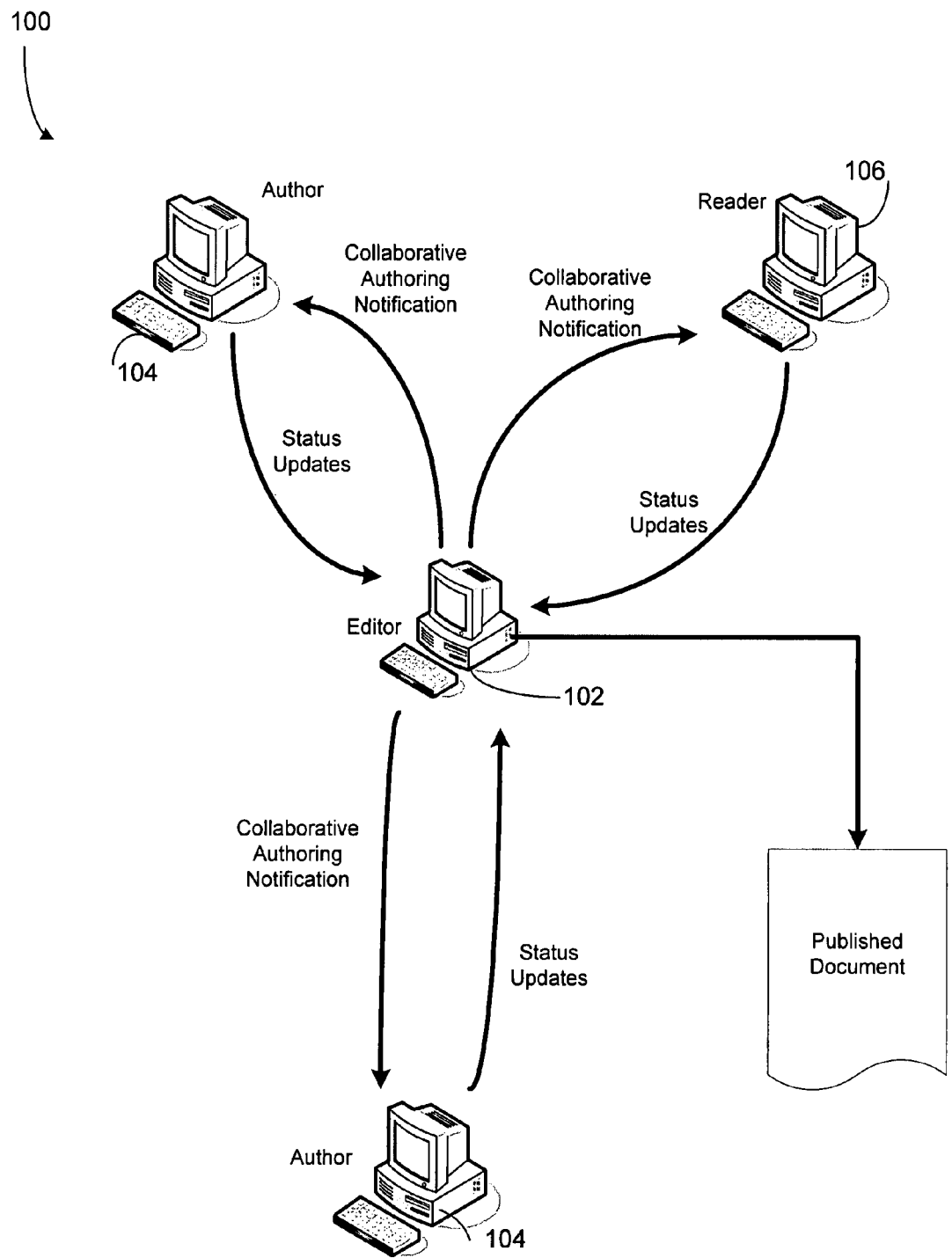
FIG. 1 represents one exemplary and generalized system overview for collaborative authoring.
Figure 17:
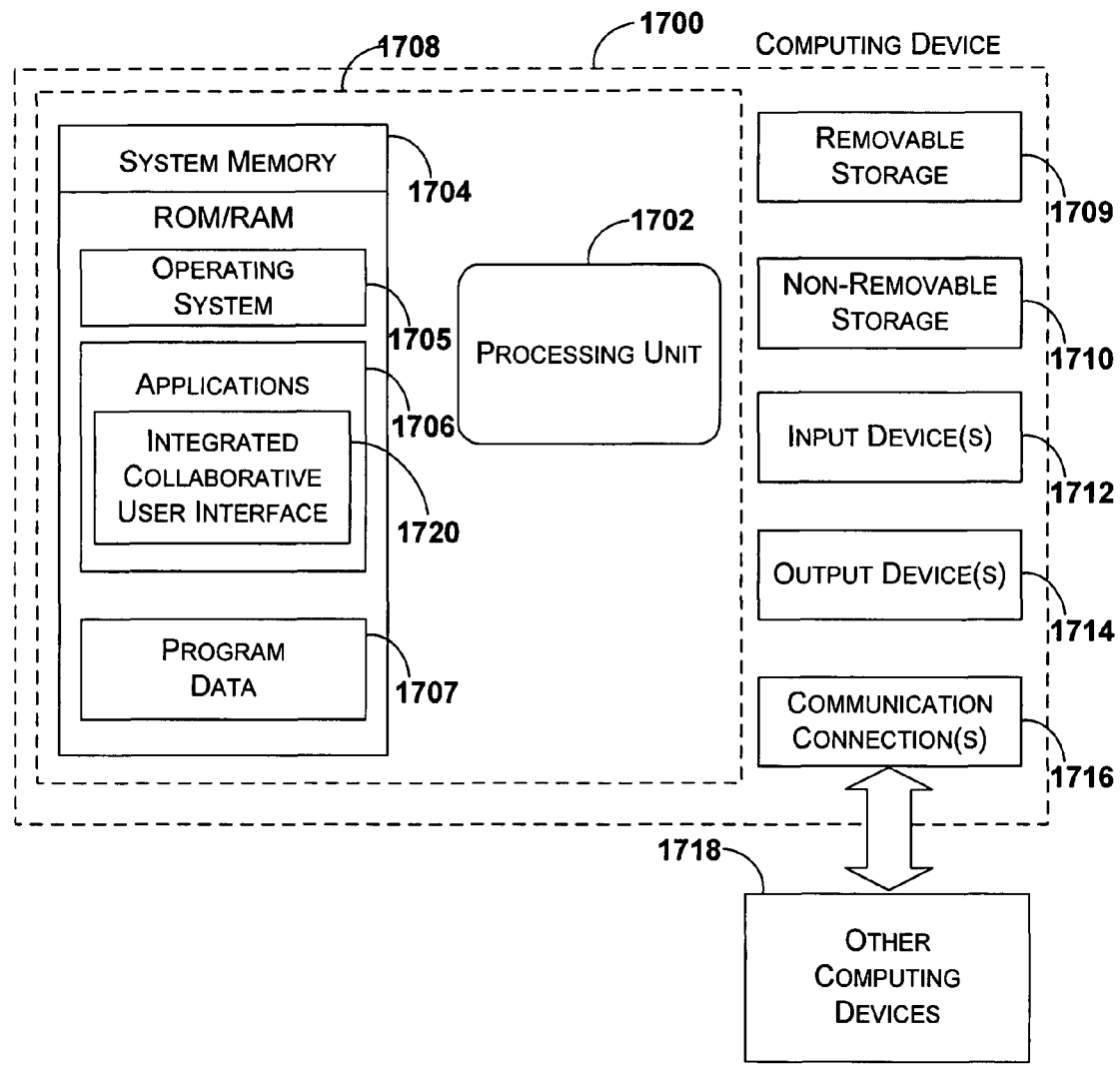
FIG. 17 represents an exemplary computing device.

FIG. 1 represents one exemplary and generalized system overview for collaborative authoring. System 100 includes editor 102, and author(s) 104 and reader 106. Editor 102 and author(s) 104 may include a computing environment as depicted in FIG. 17 below. Editor 102 generates a collaborative authoring notification indicating that a document has been generated for collaborative authoring. Author(s) 104 collaborate on the document in accordance with the document and section details generated by editor 102. Author(s) 104 submit additions to the document and update the status for the document sections. Reader 106 is a participant who is allowed read-only access to the collaboration process. Upon refreshing, reader 106, editor 102 and author(s) 104 may view an updated document. In other aspects, reader 106, editor 102 and author(s) 104 may view an updated document according to viewing privileges. Features of the integrated collaborative user interface are more fully set forth below.

Figure 2:
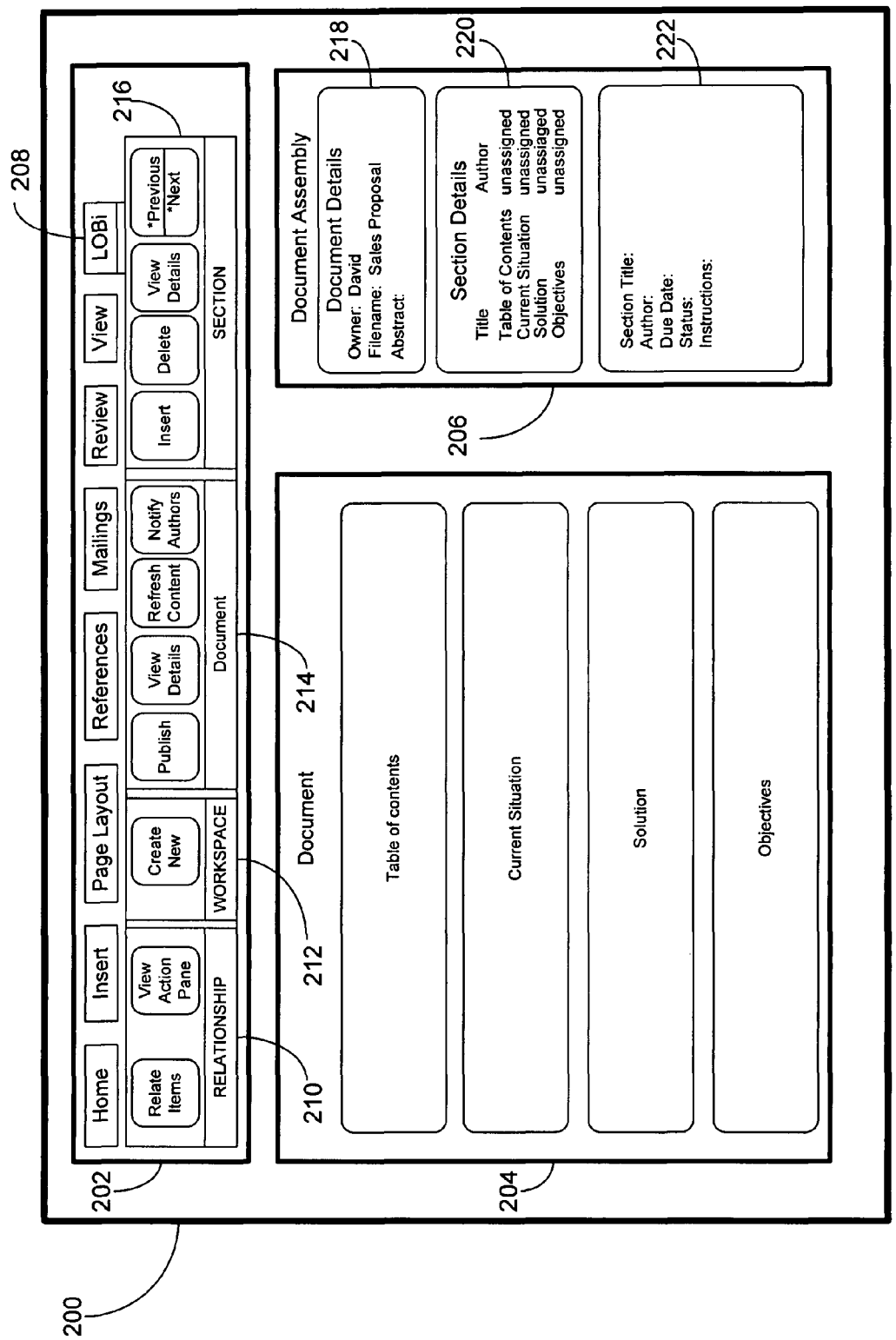
FIG. 2 represents general editor features of an integrated collaborative user interface for a document editor program.

FIG. 2 represents general editor features of an integrated collaborative user interface for a document editor program. Document editor 200 includes ribbon menu pane 202, document editing pane 204, and document assembly pane 206. Ribbon menu pane 202 includes line of business integration ribbon 208. Line of business integration ribbon 208 includes collaborative authoring functionality so that an author/editor does not need to navigate from document editor 200 to perform collaborative authoring. The functionality of a collaborative authoring environment is accessible and integrated in the document editor program so that a user may perform collaborative functions while preparing a document.

Line of business ribbon 208 includes relationship ribbon 210, workspace ribbon 212, document ribbon 214 and section ribbon 216. Relationship ribbon 210 includes a related items button and a view action pane button. Workspace pane 212 includes a create new button. Document pane 214 includes a publish button, a view details button, a refresh button, and a notify authors button. Section pane 216 includes an insert button, a delete button, a view details button, a previous button, and a next button. The buttons associated with line of business ribbon 208, depicted in FIG. 2, are examples. Functionality associated with Line of business ribbon 208 may include any type of button or feature for collaborative authoring and are not limited to those depicted in FIG. 2.

Upon receiving a selection of line of business ribbon 208, document assembly pane 206 may be displayed in document editor 200. Document assembly pane 206 includes document details pane 218. Document details pane 218 may include metadata associated with a document generated for collaborative authoring. Document details pane 218 may display the owner of the document. For example, the owner may be an editor of the document or a team leader for a group. Document details pane 218 may include a filename for the document and an abstract. The abstract may display a text blurb describing the content of the document. From document details pane 218, an owner or assigned author may quickly tell who created the collaborative document, the file name of the document and the general subject matter of the document.

Document assembly pane 206 may also include section details pane 220. Section details pane displays metadata associated with each section of the document. Section details pane 220 includes a title and an author section. Section details pane 220 displays the titles associated with the document along with the author assigned to each title. In this manner an editor or author may easily determine an assignment of authoring tasks. For example, section details pane 220 depicts four sections which correspond to sections of document 204. Each section may be assigned an author responsible for the section. Even though document 204 is depicted as several block sections, document 204 may be formatted as a word processing document utilizing a markup language ("ML"). The ML correlates the document sections with metadata associated with document assembly pane 206.

Document assembly pane 206 may also include expanded section details pane 222. The expanded sections details pane 222 may populate and/or display metadata associated with a selected section. Expanded sections details pane 222 includes a section title, an author, a due date for the authoring of the section, the status of the section, and instructions for authoring the section. As an example, the table of contents may be selected in section details pane 220. Upon selecting, expanded sections details pane 222 displays the section title as "Table of Contents." The author is displayed as the author selected for the section by the owner of the document. The due date for the section is displayed. The status of the section is displayed (e.g. unassigned, assigned, draft, completed, etc). Instructions for drafting may also be displayed. In this manner, an editor or author may easily generate a collaborative authoring document, assign a collaborative authoring document, update a collaborative authoring document, check status of a collaborative authoring document, refresh a collaborative authoring document and publish a collaborative authoring document.

Figure 3:
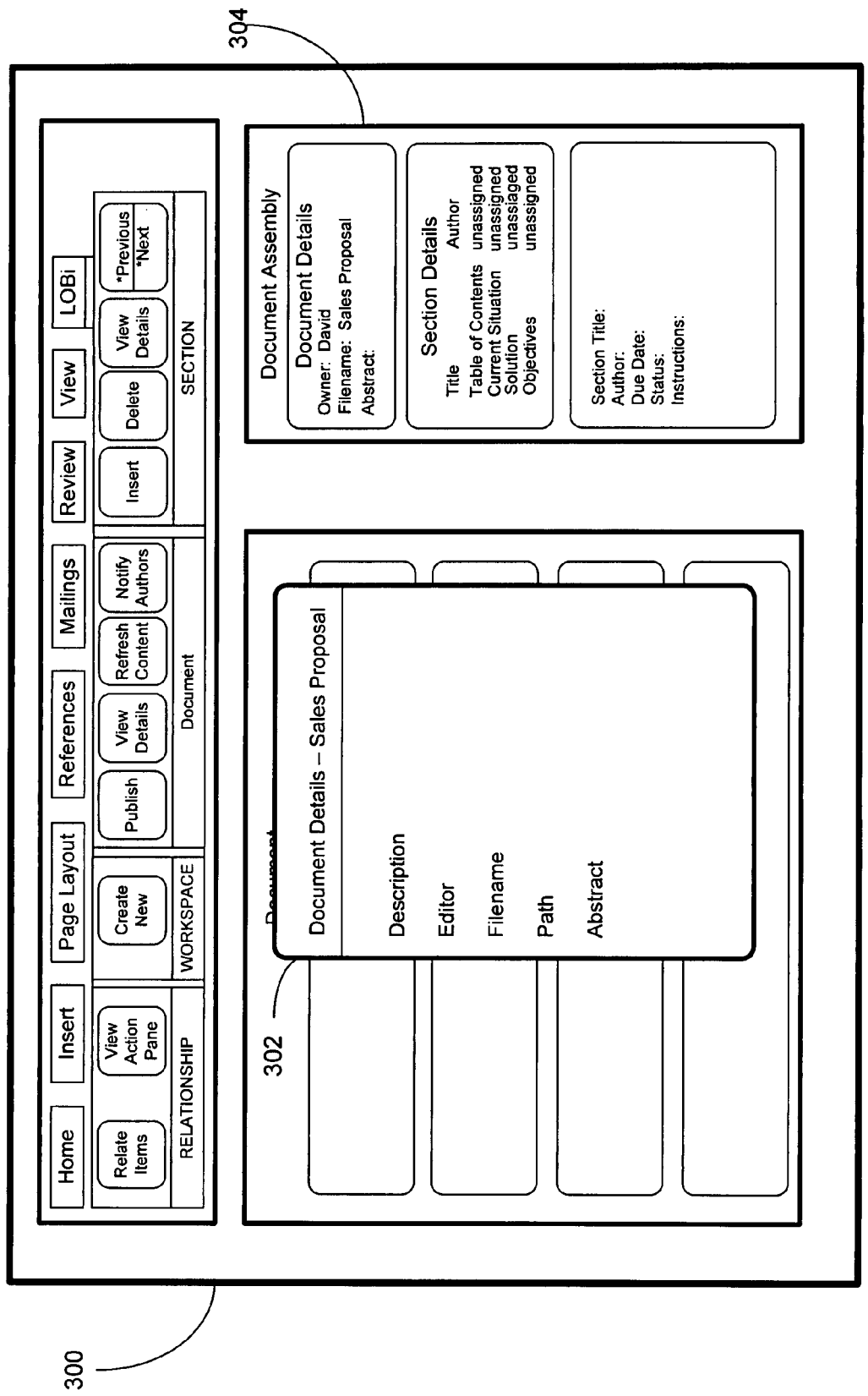
FIG. 3 represents document details of an integrated collaborative user interface for a document editor program.

FIG. 3 represents document details of an integrated collaborative user interface for a document editor program. Document editor 300 includes document details set-up interface 302. Document details set-up interface 302 provides an editing interface for editing document level properties. Document details set-up interface 302 includes a description field for receiving a description of the document. Document details set-up interface 302 also includes an editor field for identifying the editor of the document. Document details set-up interface 302 may include a filename field for identifying the filename associated with the document. Document details set-up interface 302 also includes a path field for receiving a path associated with a workspace in a multi-user environment. Document details set-up interface 302 may also include an abstract field for receiving an abstract of the document. After the fields are populated or changed, the received data may be displayed in association with document assembly pane 304.

Figure 4:
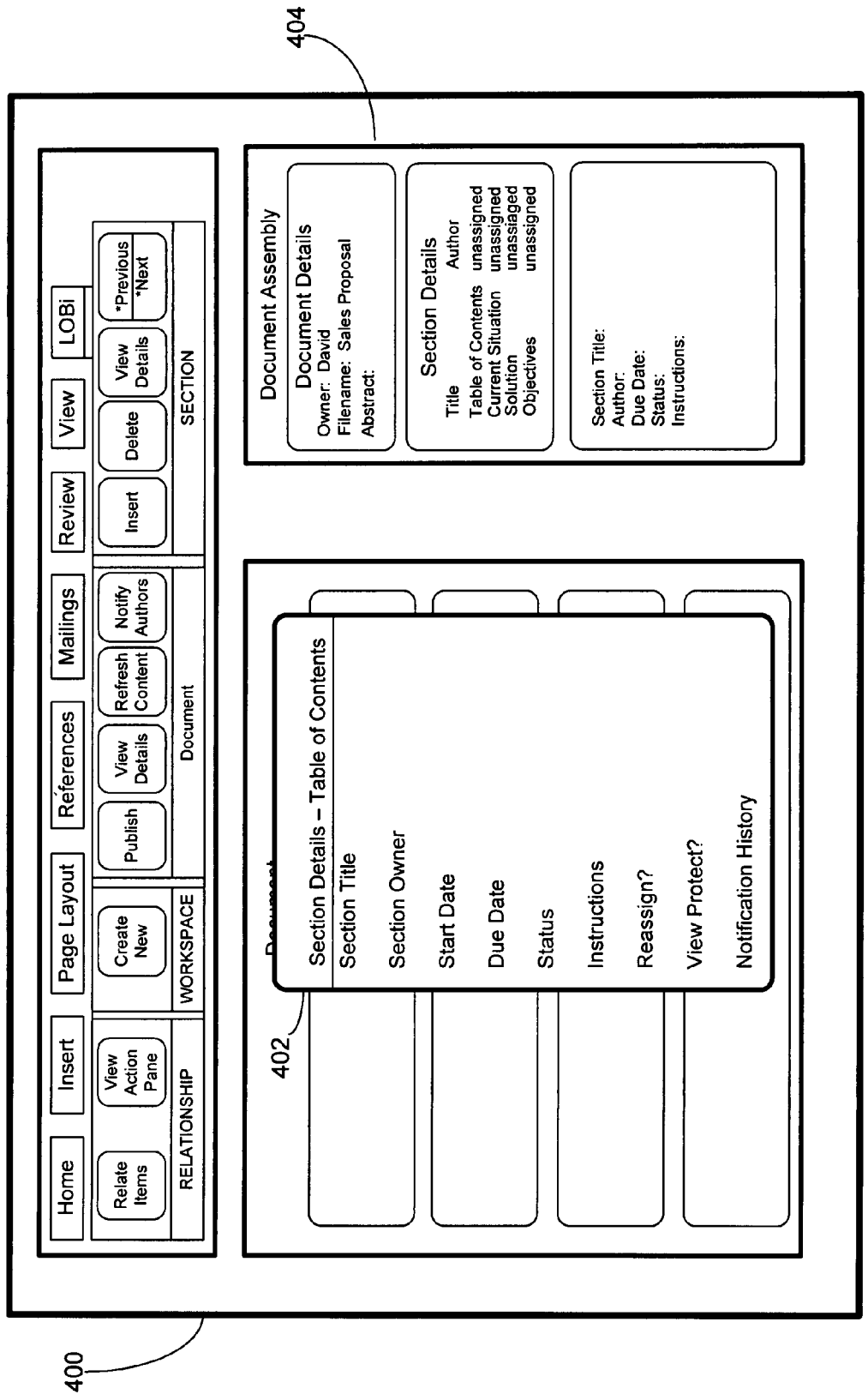
FIG. 4 represents section details of an integrated collaborative user interface for a document editor program.

FIG. 4 represents section details of an integrated collaborative user interface for a document editor. Document editor 400 includes section details set-up interface 402. Section details set-up interface 402 provides an editing interface for editing section level properties. Section details set-up interface 402 includes a section title field for receiving a title for a section of the document. Section details set-up interface 402 includes a section owner field for assigning an author for the section. Section details set-up interface 402 includes a start date field for receiving data associated with the start of an authoring project. Section details set-up interface 402 includes a due date field for setting a completion date for the section or project. Section details set-up interface 402 includes a status field for indicating a status of the section (e.g. assigned, unassigned, draft, completed, etc). Section details set-up interface 402 includes instructions field for receiving instructions to associate with the section during authoring. Section details set-up interface 402 includes reassignment field which either locks or opens reassignment functionality for an editor or author. For example, an editor may assign a section to a first author and then later reassign the section to a second author. As another example, an editor may assign a section to a team leader author and the team leader author may reassign the section to a team member. Section details set-up interface 402 may include a view protection field. The view protection field may be set to restrict access of the section. For example, the editor may assign section 1 to author 1. The editor may not want author 2 to view section 1. The editor may set a section view restriction on section 1 so that author 2 cannot see section 1 of the document. As another example, the view protection field may lock the document for editing except for sections the user has rights to edit. As such, authors would not be able to edit sections not assigned to them and readers would not be able to edit the document sections. In other cases, a section may be flagged as hidden so that users granted read access can see the content while users not granted access cannot. Section details set-up interface 402 may also include a notification history field that indicates when the assigned author was assigned the section. After the fields are populated or changed, the received data may be displayed in association with document assembly pane 404.

Figure 5:
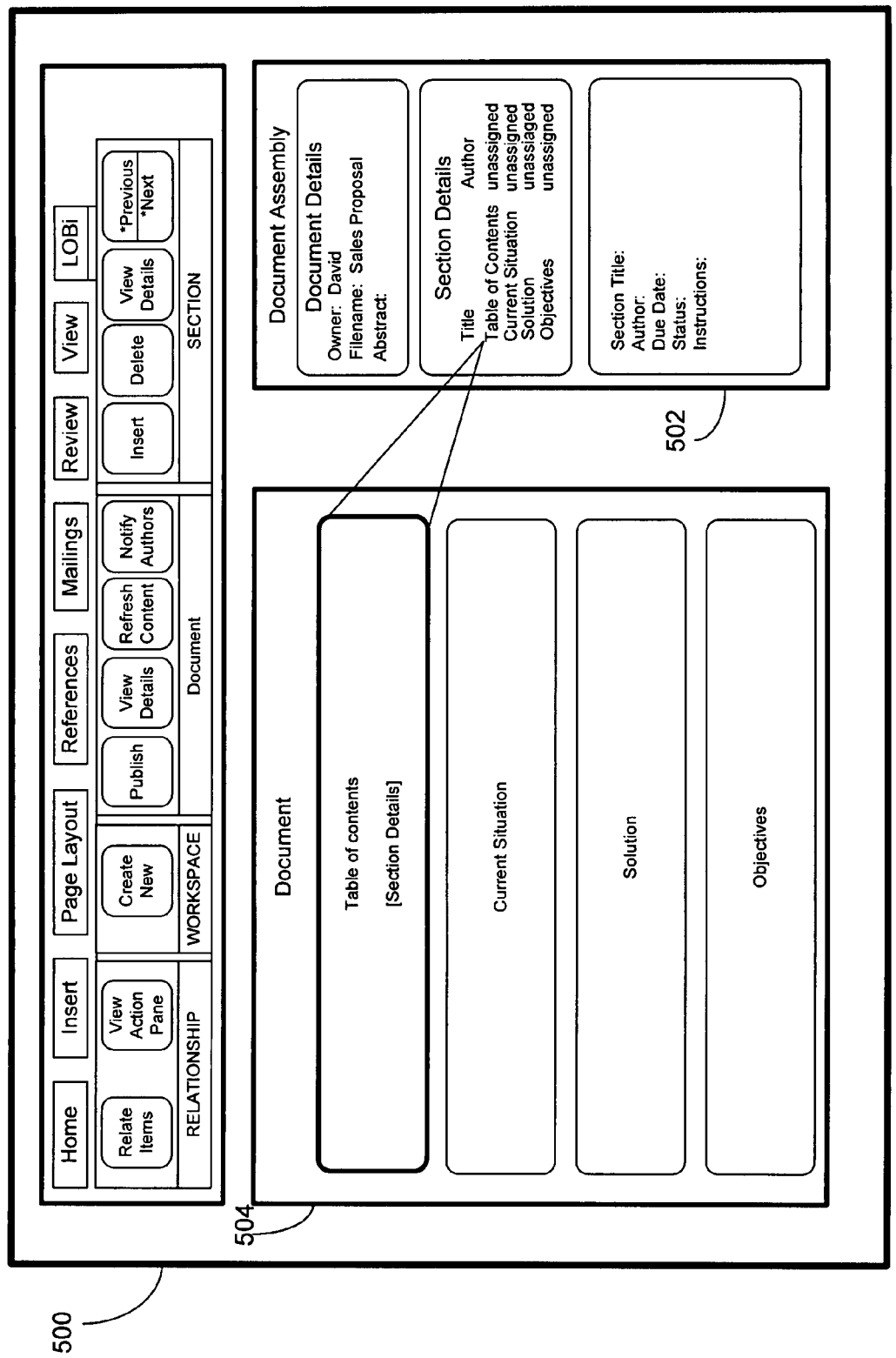
FIG. 5 represents selected section details of an integrated collaborative user interface for a document editor program.

FIG. 5 represents selected section details of an integrated collaborative user interface for a document editor program. Document editor 500 includes section detail pane 502. When a title of the document is selected, document editor 500 navigates to the respective portion of document 504. For example, a user may be on page 50 of document 504. The user may desire viewing the progression of an assigned author in association with the table of contents. By selecting the table of contents in section details pane 502, the editor table of contents portion of the document is automatically displayed.

Figure 6:
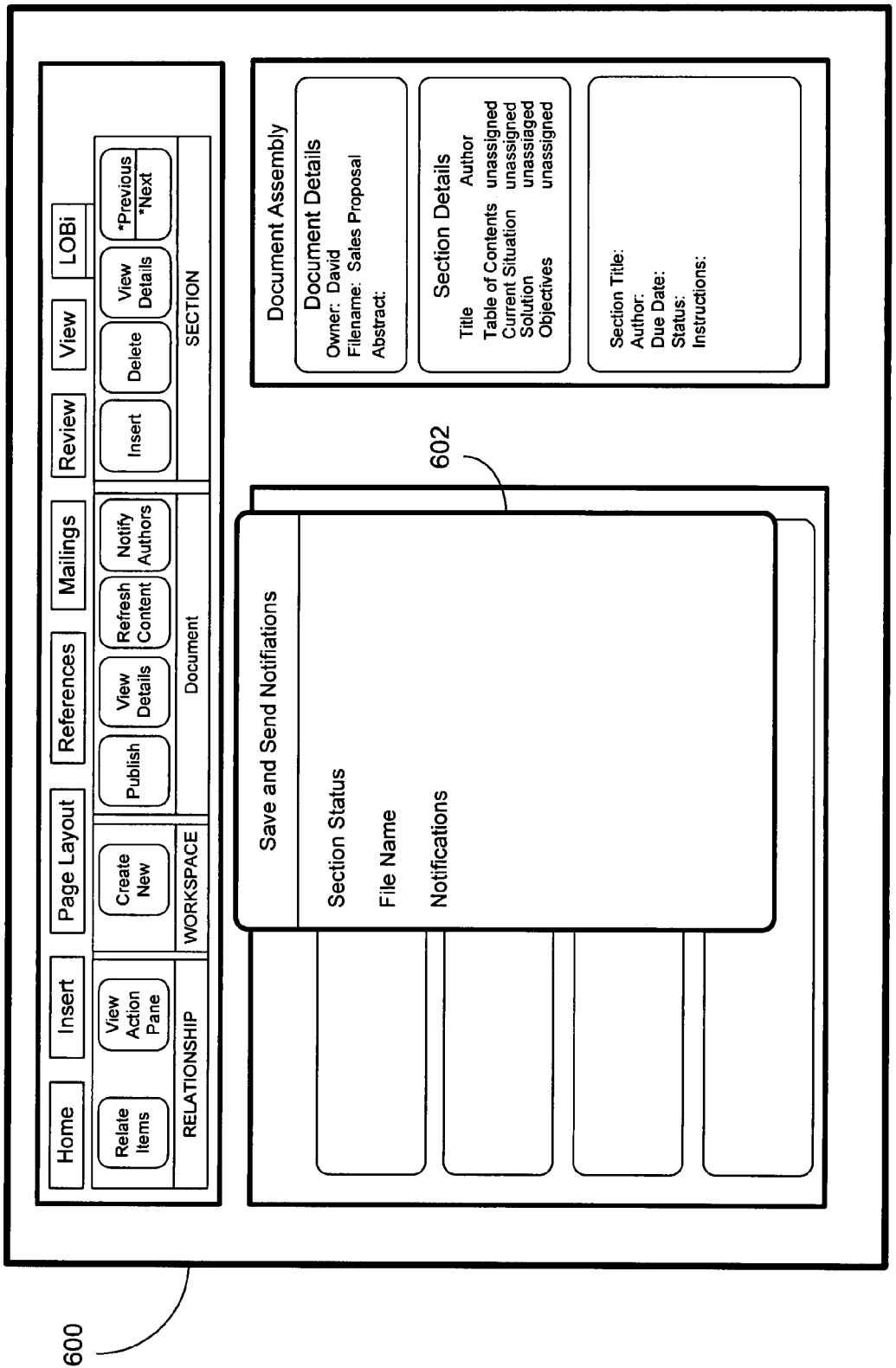
FIG. 6 represents notification features of an integrated collaborative user interface for a document editor program.

FIG. 6 represents notification features of an integrated collaborative user interface for a document editor program. Document editor 600 includes notification interface 602. Notification interface 602 includes section status field which includes a summary of the status of the sections of the document. Notification interface 602 also includes file name field for identifying the file name of the document. Notification interface 602 also includes notification field for sending notifications to authors assigned to sections.

Figure 7:
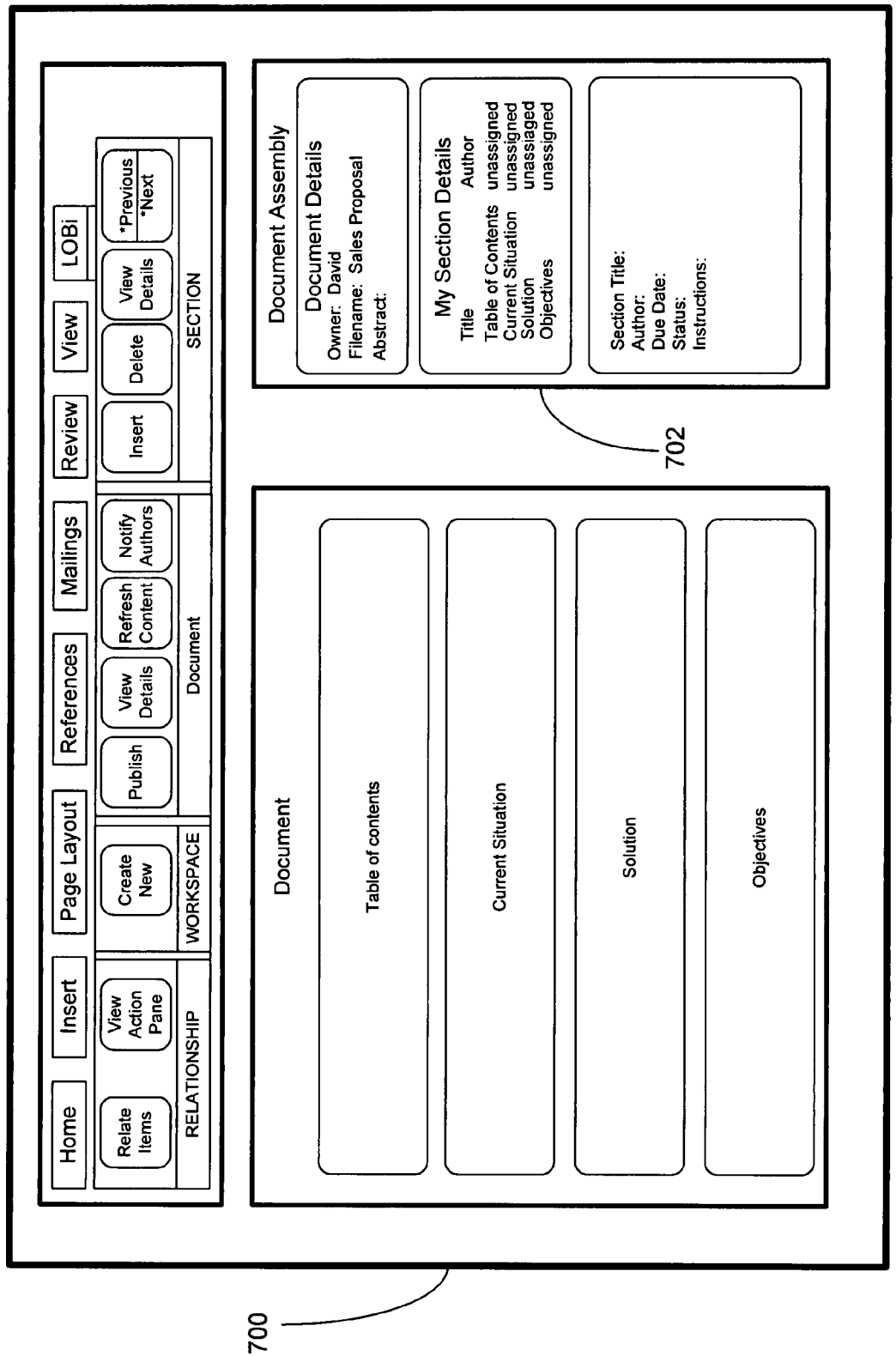
FIG. 7 represents general author features of an integrated collaborative user interface for a document editor program.

FIG. 7 represents general author features of an integrated collaborative user interface for a document editor program. Document editor 700 includes a document editor of an author after the author has been notified that the editor has implemented collaborative authoring. Document editor 700 includes similar functionality and panes as FIG. 2. Document editor 700 includes document assembly pane 702. Document assembly pane 702 includes the metadata set by the owner of the document. From document assembly pane 702 a collaborative author may easily determine what sections have been assigned to the author, the due date of the sections, the status of the sections, an abstract of the document, and any instructions for completing the section. In one aspect, document assembly pane 702 displays the authors assigned to sections of the document. In another aspect, document assembly pane 702 displays all of the assignments and the authors for the assignments. In still another aspect, the author has limited access to the document.

Figure 8:
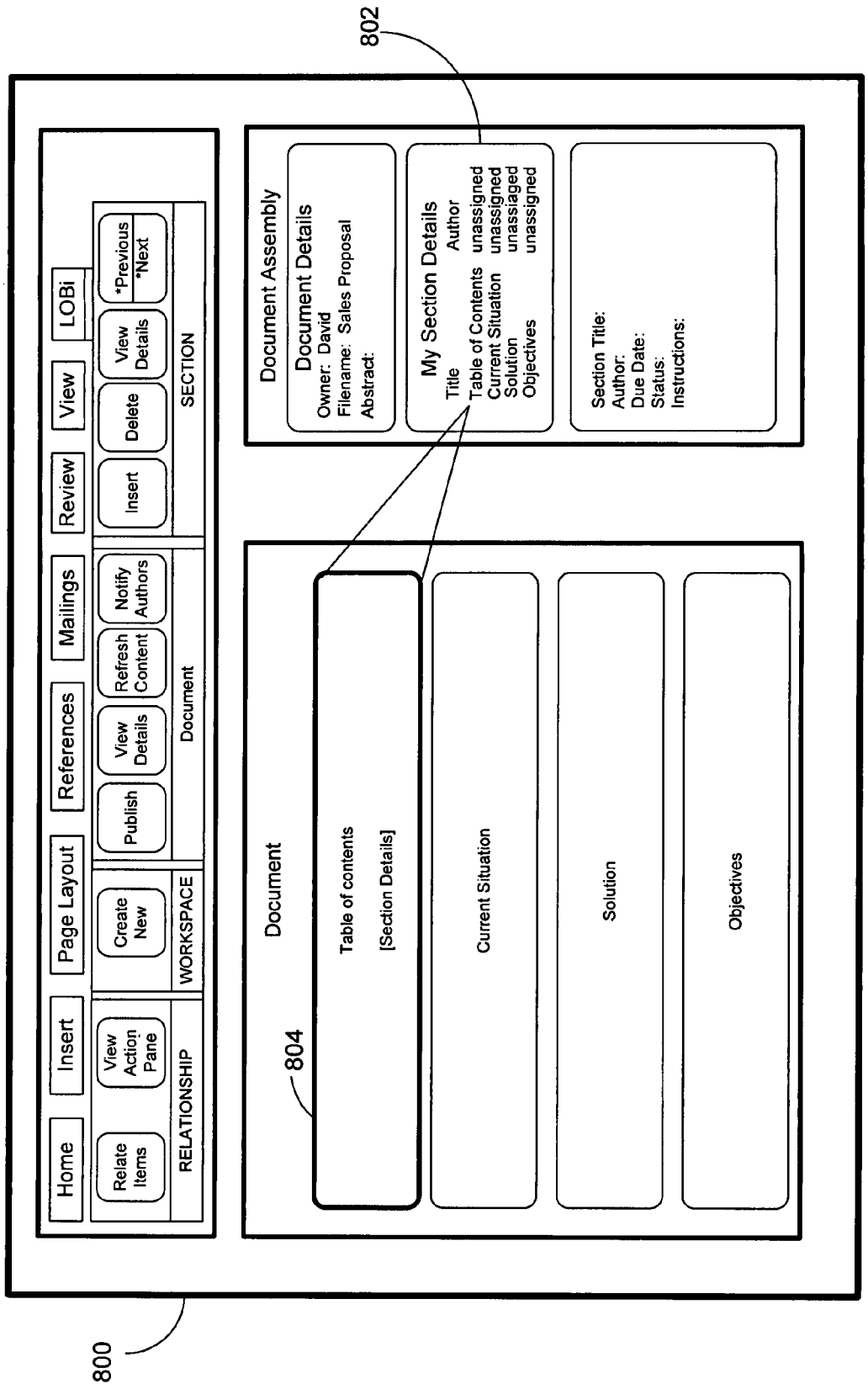
FIG. 8 represents author selected section details of an integrated collaborative user interface for a document editor program.

FIG. 8 represents author selected section details of an integrated collaborative user interface for a document editor program. Document editor 800 includes section detail pane 802. When an author selects a title of the document, document editor 800 navigates to the respective portion of document 804. In one aspect, the section details metadata that the editor associated with the section are displayed to the author. In this manner, the author may easily determine the purpose of the section.

Figure 9:
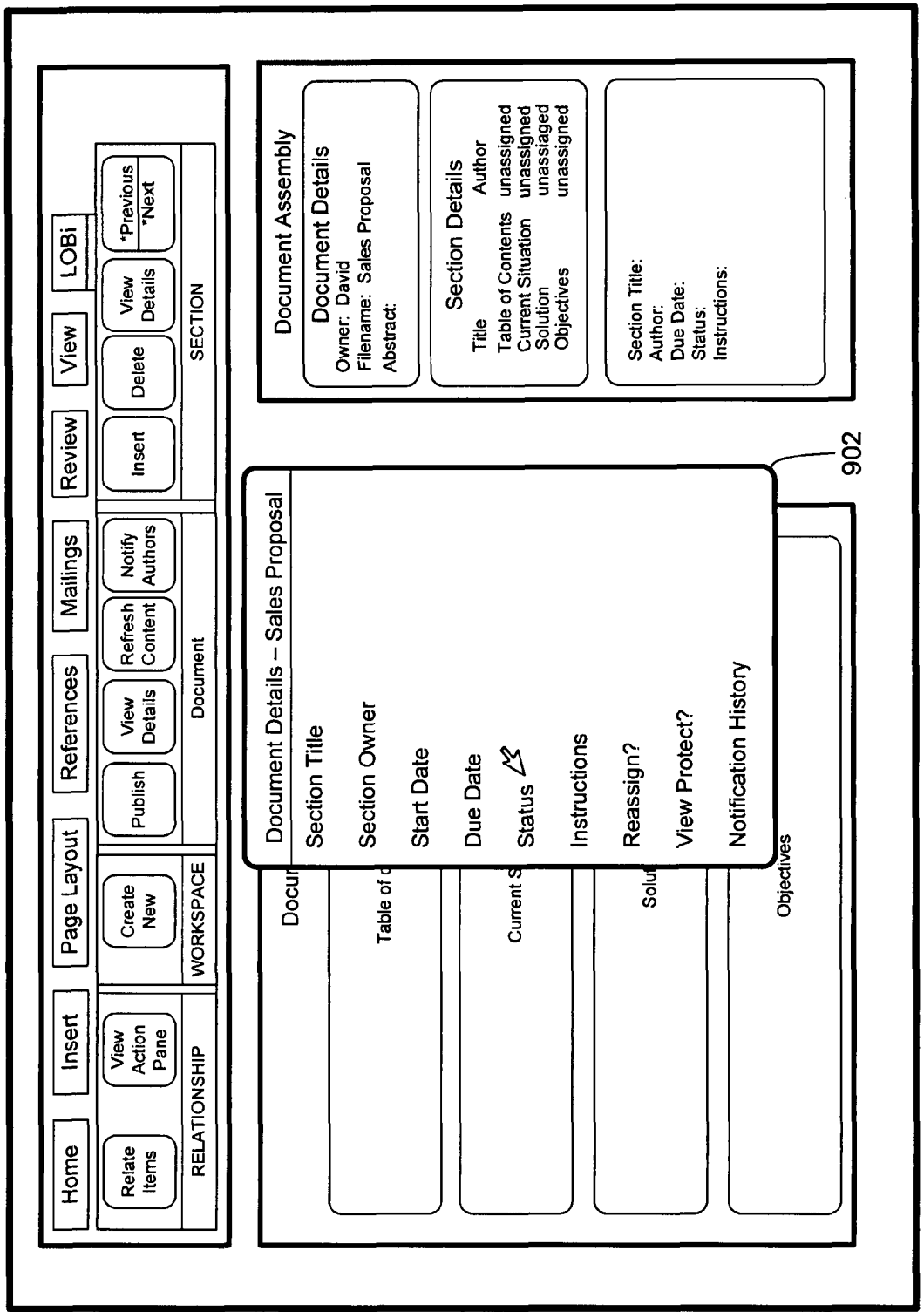
FIG. 9 represents author document details of an integrated collaborative user interface for a document editor program.

FIG. 9 represents author document details of an integrated collaborative user interface for a document editor program. Document editor 900 includes document details set-up interface 902. When the author is finished drafting the section, the author may access document details set-up interface 902 and change the status of the document. For example, the author may change the status of the document from "assigned" to "draft."

Figure 10:
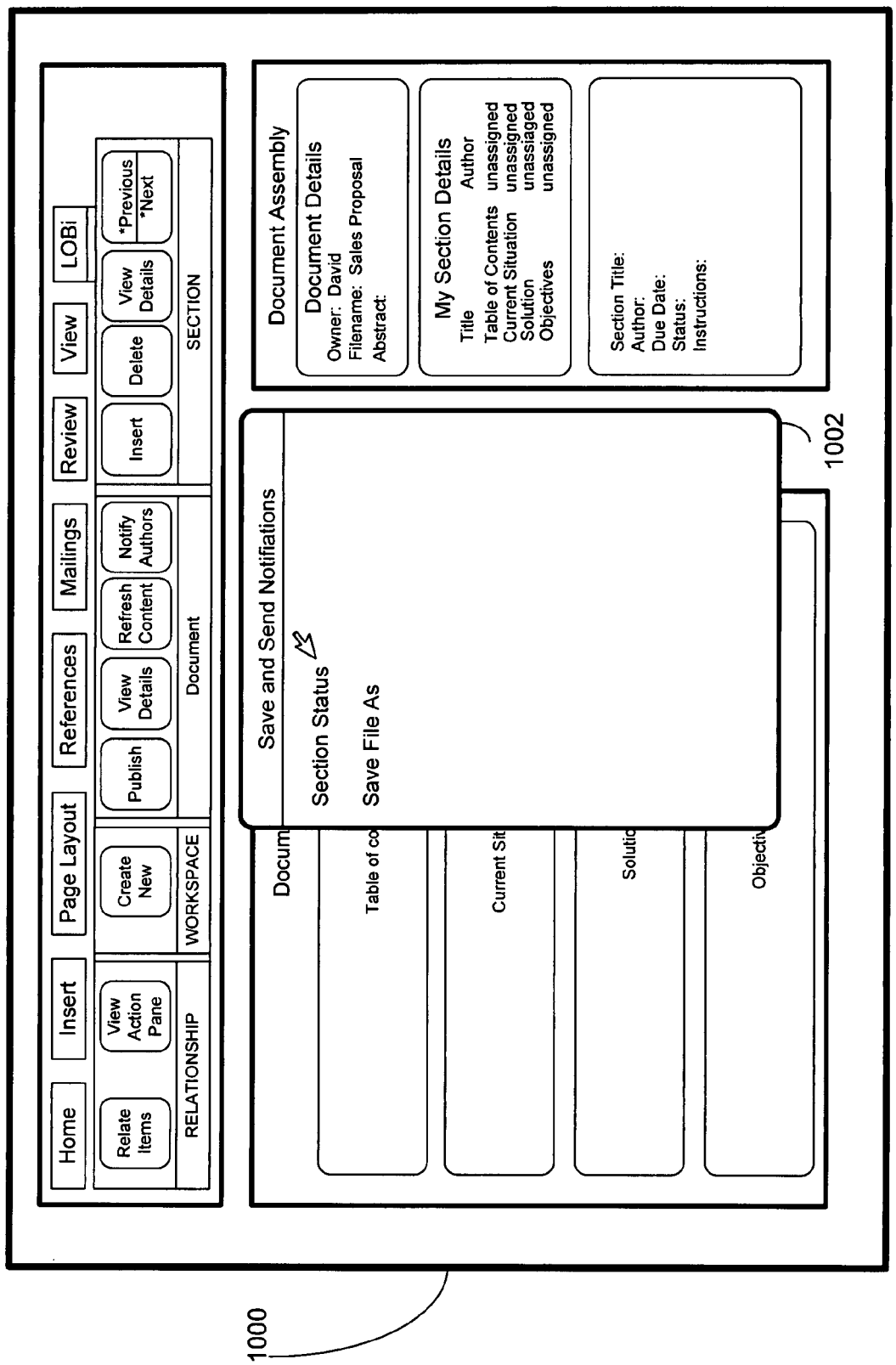
FIG. 10 represents a section status update feature of an integrated collaborative user interface for a document editor program.

FIG. 10 represents a section status update feature of an integrated collaborative user interface for a document editor program. Document editor 1000 includes notification pane 1002. Notification pane 1002 includes a section status field for indicating the status of the section. Notification pane 1002 also includes a save field for saving a new status of the section. Once the section is saved, a notification may be sent to the editor/authors that the status of the section has been changed.

Figure 11:
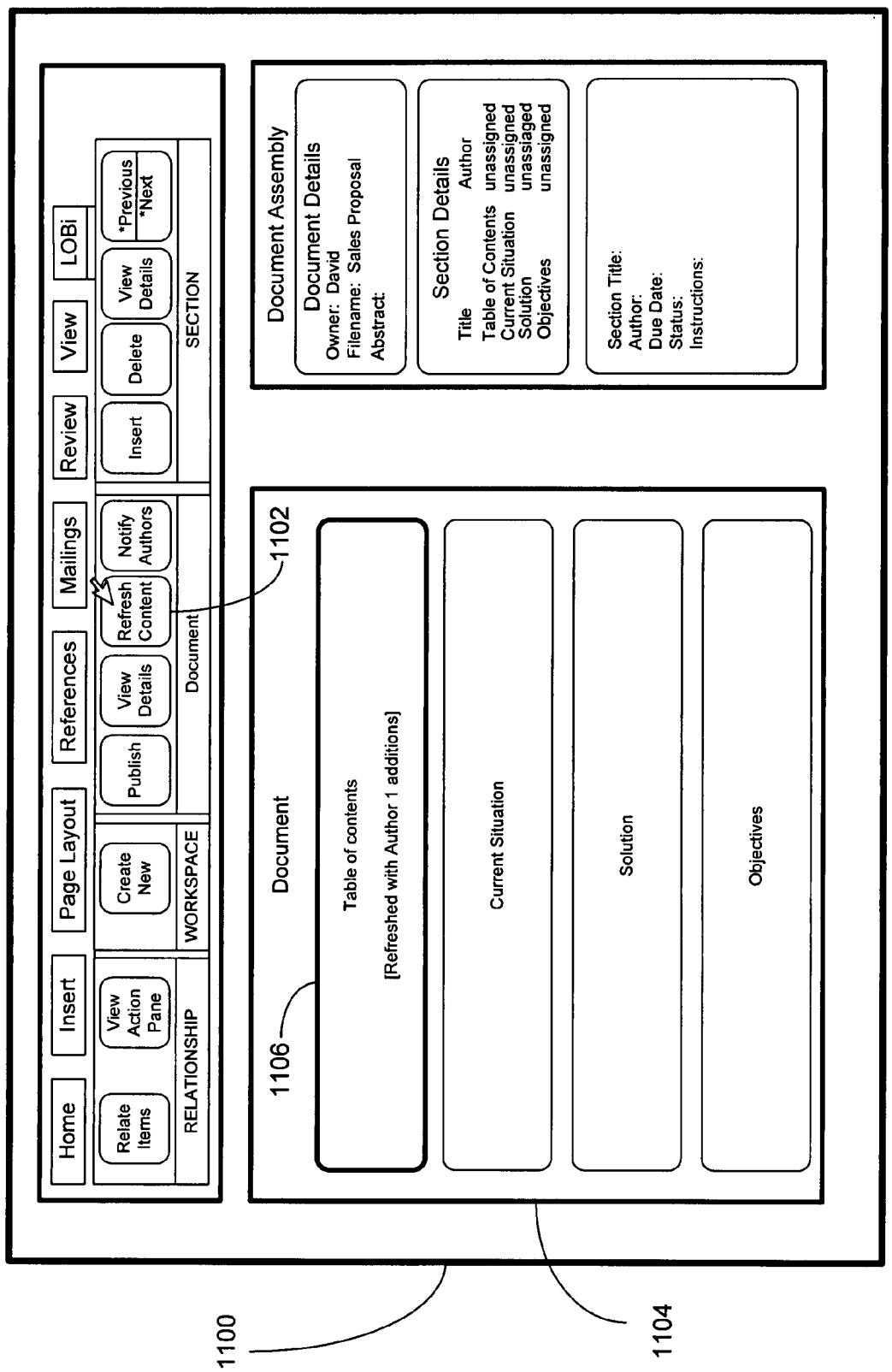
FIG. 11 represents a refresh feature of an integrated collaborative user interface for a document editor program.

FIG. 11 represents a refresh feature of an integrated collaborative user interface for a document editor program. Document editor 1100 may include features of the collaborative user interface when an editor/author refreshes the document. Refresh button 1102 is selected. Document 1104 automatically populates with updated content associated with sections that have been changed during an authoring period. In this manner, an editor may easily refresh a document to determine the current state of the document. As depicted in FIG. 11, table of contents section 1106 is updated to include the content the author generated. The refresh feature may be implemented from either the authors interface or the editors interface.

Figure 12:
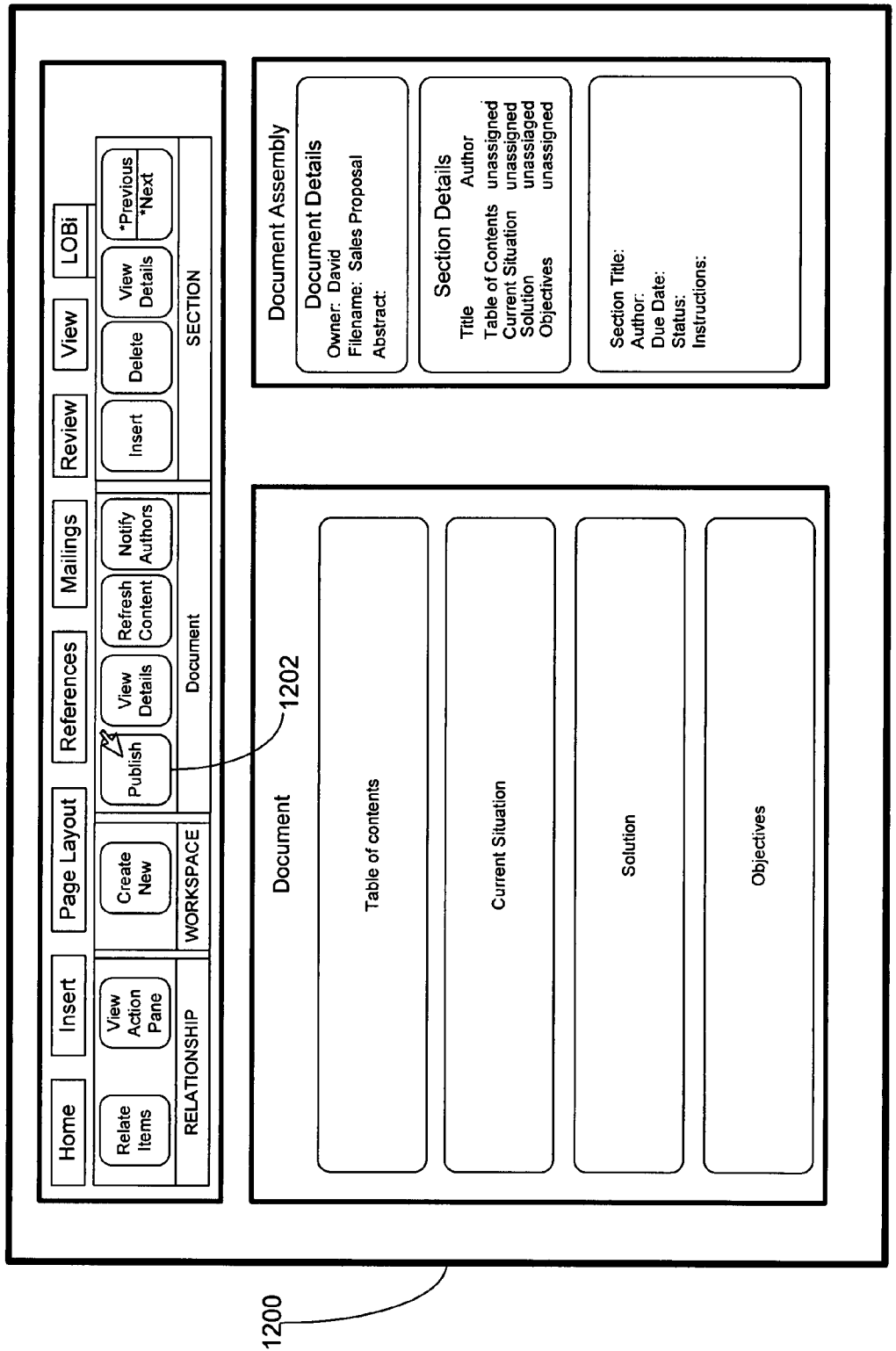
FIG. 12 represents a publish feature of an integrated collaborative user interface for a document editor program.

FIG. 12 represents a publish feature of an integrated collaborative user interface for a document editor program. Document editor 1200 may includes features of the collaborative user interface when an editor publishes the document. Publish button 1202 is selected.

Figure 13:
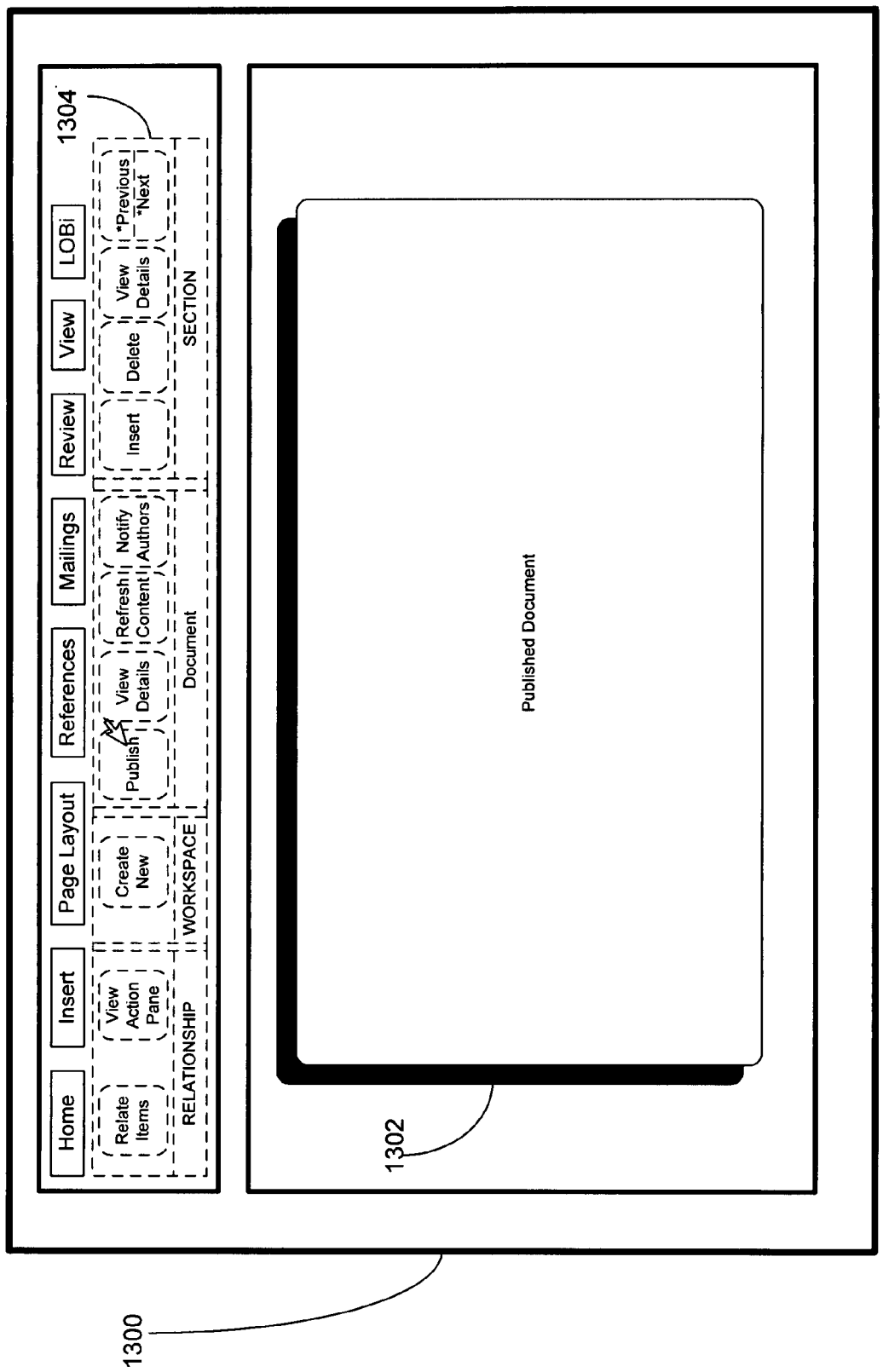
FIG. 13 represents a published document of an integrated collaborative user interface for a document editor program.

FIG. 13 represents a published document of an integrated collaborative user interface for a document editor program. Document editor 1300 includes published document 1302. When the document is published, the document assembly pane may be removed from document editor 1300 to provide an optimized view of the published document. Also, line of business ribbon 1304 may be disabled to indicate that the user interface is no longer in a collaborative mode.

Figure 14:
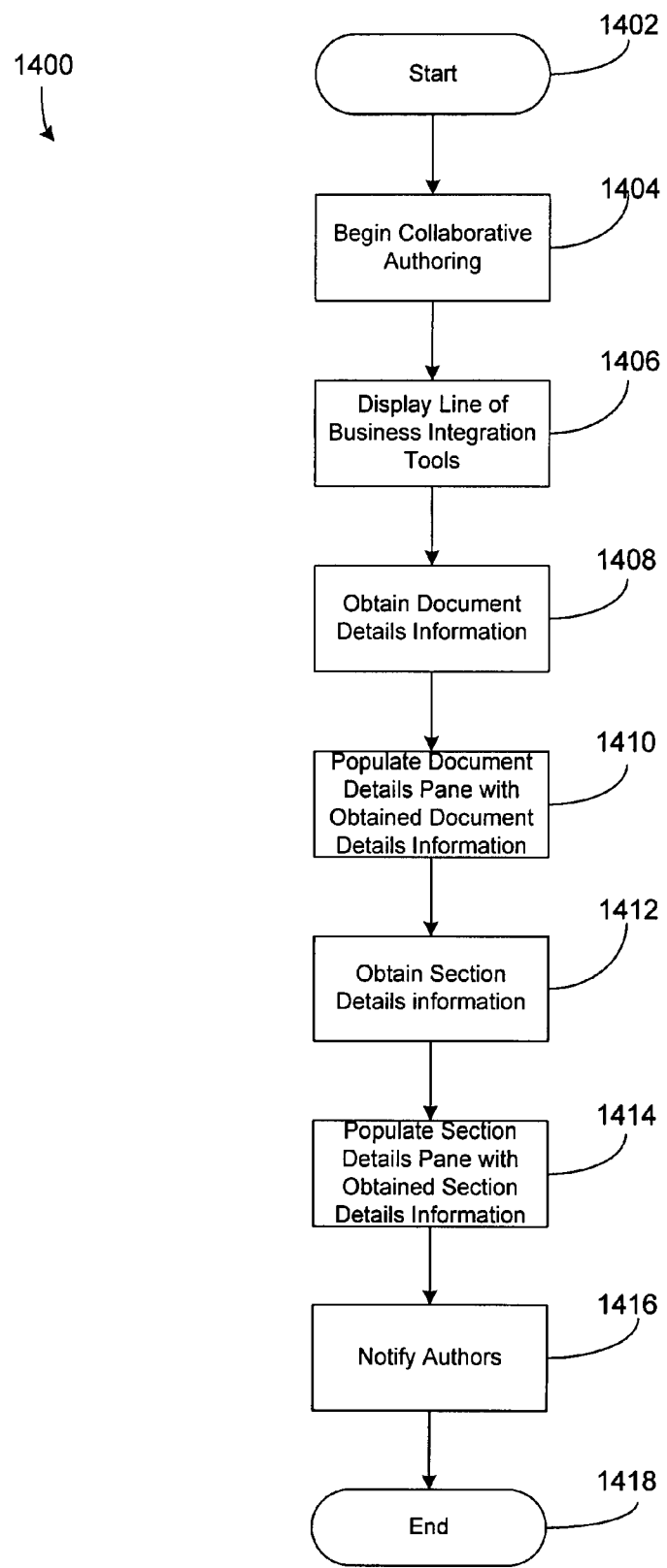
FIG. 14 represents an operational flow diagram for generating editor data for collaborative authoring.

FIG. 14 represents an operational flow diagram for generating editor data for collaborative authoring. Operational flow 1400 may represent operations associated with an editor setting up collaborative authoring on an integrated collaborative user interface. Operational flow 1400 begins at start operation 1402 and continues to operation 1404 where collaborative authoring is initiated. In one aspect, a line of business ribbon is actuated to initiate collaborative authoring. In another aspect, collaborative authoring is initiated from a menu.

Operational flow 1400 continues to operation 1406 where business integration tools are displayed. As depicted in FIG. 2, business integration tool may include a line of business integration ribbon and a document assembly pane. Operational flow 1400 continues to operation 1408 where document detail information is obtained. Document details may include details as depicted in FIG. 3. Operational flow 1400 continues to operation 1410 where the document details pane is populated with obtained document details information.

Operational flow 1400 continues to operation 1412 where section details information is obtained. Section details may include details as depicted in FIG. 4. Operational flow 1400 continues to operation 1414 where the section details pane is populated with obtained section details information. At operation 1416, the authors associated with the sections are notified that they have been selected for collaborative authoring of a document. Operational flow 1400 ends at end operation 1418.

Figure 15:
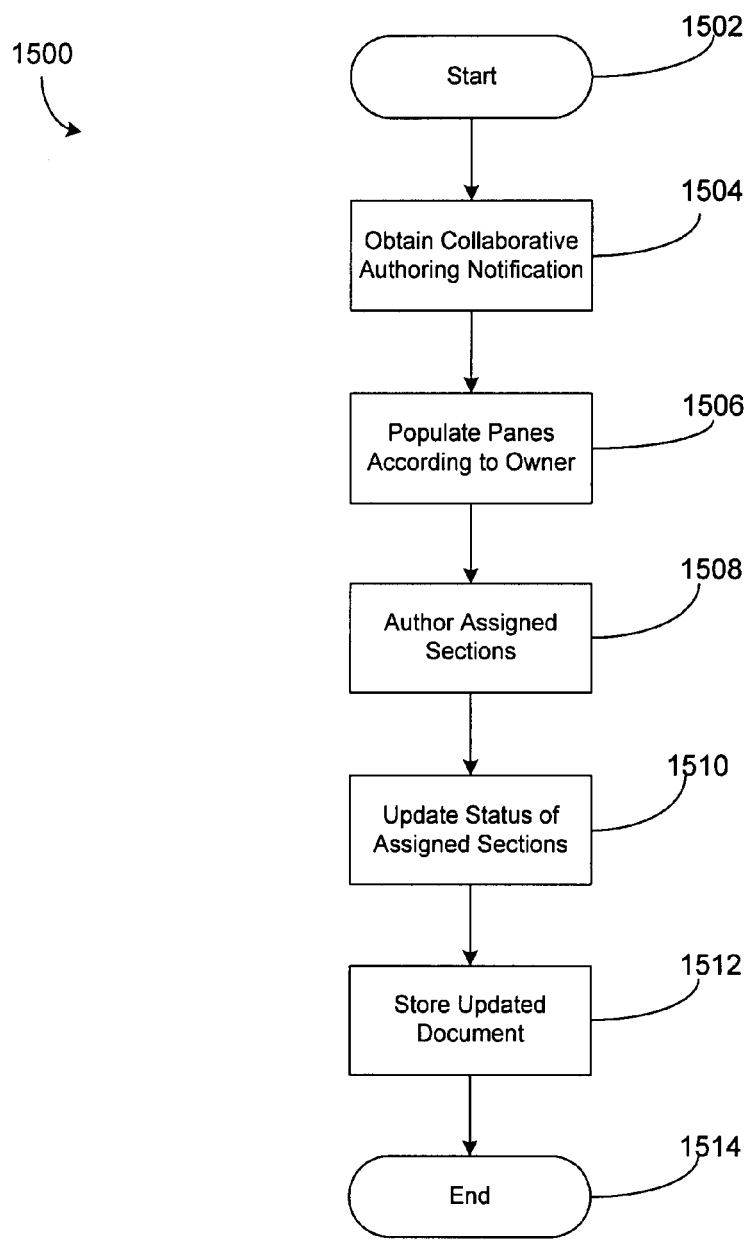
FIG. 15 represents an operational flow diagram for generating author data for collaborative authoring.

FIG. 15 represents an operational flow diagram for generating author data for collaborative authoring. Operational flow 1500 may represent operations associated with an author collaboratively authoring in association with an integrated collaborative user interface. Operational flow 1500 begins at start operation 1502 and continues to operation 1504 where a collaborative authoring notification is obtained. At operation 1506, the document assembly pane of the author is populated with the document and section metadata in accordance with the metadata input by the editor. Operational flow 1500 continues to operation 1508 where the author drafts the assigned section of the document. When the draft is finished, the status of the document is updated as shown by operation 1510. Operational flow 1500 continues to operation 1512 where the updated document and document status are stored. The editor and/or other authors may be sent a notification indicating the update. Operational flow 1500 continues to end operation 1514.

Figure 16:
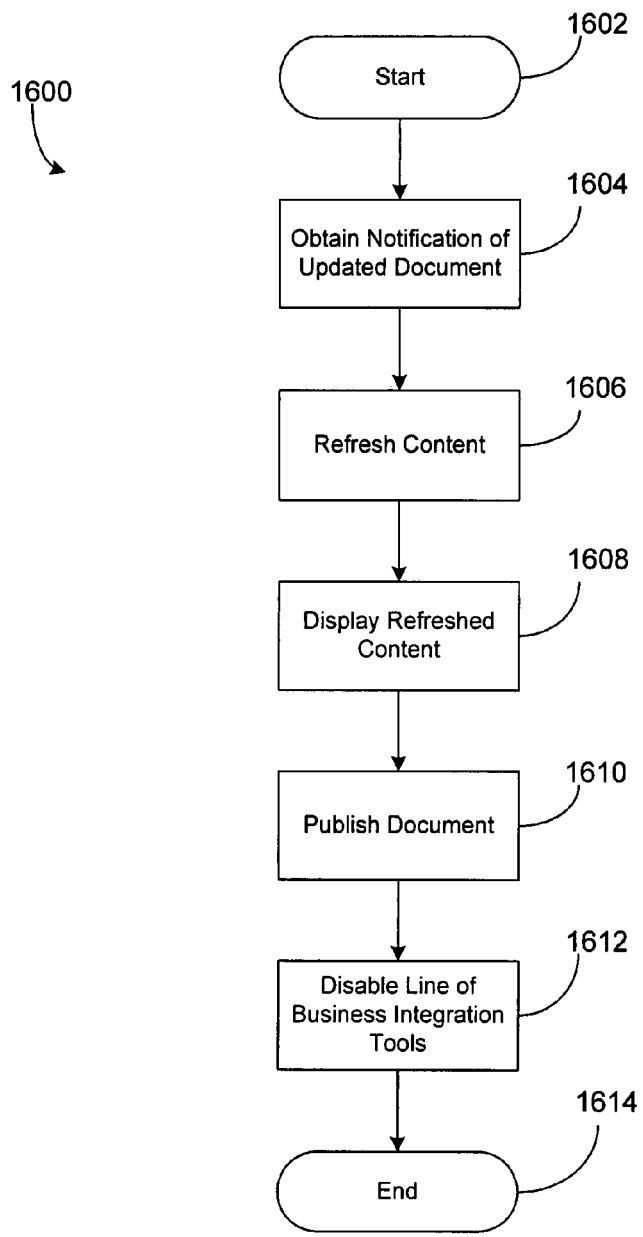
FIG. 16 represents an operational flow diagram for publishing a document associated with collaborative authoring.

FIG. 16 represents an operational flow diagram for publishing a document associated with collaborative authoring. Operational flow 1600 may represent operations associated with an editor after the editor has received a notification that the status of one or more sections has changed. Operational flow 1600 begins at start operation 1602 and continues to operation 1604 where a status update notification is obtained. At operation 1606, the content is refreshed and the updated content is displayed in the document as indicated by operation 1608. At operation 1610, the document is published and at operation 1612 the line of integration tools are disabled. Operation flow 1600 continues to end operation 1614.

As set forth herein, the integrated collaborative user interface allows multiple authors to edit the content of different sections of the same document in parallel. The changes may be submitted at any time and the changes may be received by one or more of the authors. The integrated collaborative interface provides custom actions for starting and managing collaborative authoring. An editor may assign various sections of the document to various authors. The integrated collaborative user interface allows authors to see and modify the structures of a document. Properties may also be modified. Sections of the document may further be reassigned after they have been started. In other aspects, an author may see the status of sections assigned to other authors. Integrated collaborative user interfaces also provide context-relevant notifications. An editor has the ability to shut down collaboration at any time to stop further access to a document. Authors also have the ability to work offline when documents are cached on the computing device of the author. As such, an integrated collaborative user interface provides increased authoring productivity.

Referring to FIG. 17, an exemplary system for implementing the invention includes a computing device, such as computing device 1700. In a basic configuration, computing device 1700 may include any type of stationary computing device or a mobile computing device. Computing device 1700 typically includes at least one processing unit 1702 and system memory 1704. Depending on the exact configuration and type of computing device, system memory 1704 may be volatile (such as RAM), non-volatile (such as ROM, flash memory, and the like) or some combination of the two. System memory 1704 typically includes operating system 1705, one or more applications 1706, and may include program data 1707. In one embodiment, applications 1706 further include application 1720 for mail distribution. This basic configuration is illustrated in FIG. 17 by those components within dashed line 1708.

Computing device 1700 may also have additional features or functionality. For example, computing device 1700 may also include additional data storage devices (removable and/or non-removable) such as, for example, magnetic disks, optical disks, or tape. Such additional storage is illustrated in FIG. 17 by removable storage 1709 and non-removable storage 1710. Computer storage media may include volatile and non-volatile, removable and non-removable media implemented in any method or technology for storage of information, such as computer readable instructions, data structures, program modules or other data. System memory 1704, removable storage 1709 and non-removable storage 1710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1700. Any such computer storage media may be part of device 1700. Computing device 1700 may also have input device(s) 1712 such as a keyboard, mouse, pen, voice input device, touch input device, etc. Output device(s) 1714 such as a display, speakers, printer, etc. may also be included.

Computing device 1700 also contains communication connection(s) 1716 that allow the device to communicate with other computing devices 1718, such as over a network or a wireless network. Communication connection(s) 1716 is an example of communication media. Communication media typically embodies computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A computer-implement method for providing collaborative authoring features in a document editor program, the method comprising:
   providing a document editor program that includes a line of business integration mode;
   activating the line of business integration mode;
   displaying a document editing pane in the document editor program, wherein the document editing pane includes a document having at least one section;
   displaying a document assembly pane in the document editing program, wherein the document assembly pane includes a document details pane and a section details pane;
   obtaining document details metadata, wherein the document details metadata includes metadata associated with collaboratively authoring the document;

obtaining section details metadata, wherein the section details metadata includes data associated with an author assigned to the at least one section of the document;

displaying the document details metadata in the document details pane; and displaying the section details metadata in the section details pane.

2. The computer-implemented method of claim 1, wherein the document details metadata includes at least one member of a group comprising: a document description, an assigned editor, a filename, a path, and an abstract.

3. The computer-implemented method of claim 1, wherein the section details metadata includes at least one member of a group comprising: a section title, a section owner, a start date, a due date, a status, authoring instructions, reassignment privileges, view protection, and a notification history.

4. The computer-implemented method of claim 1, wherein the section details pane includes a list of sections and assignments, wherein an expanded section details pane is populated with assignment metadata associated with a selected section.

5. The computer-implemented method of claim 4, wherein the expanded section details pane includes at least one member of a group comprising: a section title, an author, a due date, a status, and an instruction.

6. The computer-implemented method of claim 4, wherein the selection of a section in the section details pane automatically navigates the document editor pane to the selected section in the document.

7. The computer-implemented method of claim 1, wherein the document of the document editor pane and the document assembly pane are automatically updated with author changes during collaborative authoring.

8. The computer-implemented method of claim 1, further comprising publishing the document, wherein publishing the document includes disabling the line of business integration mode and hiding the document assembly pane.

9. The computer-implemented method of claim 1, further comprising a notification pane for sending a notification to an author assigned to a section.

10. The computer-implemented method of claim 1, further comprising a notification pane for sending a notification to an editor indicating that a status of an assigned section is changed.

11. A computer storage media medium having computer executable instructions for providing collaborative authoring features in a document editor program, the instructions comprising:

providing a document editor program that includes a line of business integration mode;

activating the line of business integration mode;

displaying a document editing pane in the document editor program, wherein the document editing pane includes a document having at least one section;

displaying a document assembly pane in the document editing program, wherein the document assembly pane includes a document details pane and a section details pane;

obtaining document details metadata, wherein the document details metadata includes metadata associated with collaboratively authoring the document;

obtaining section details metadata, wherein the section details metadata includes data associated with an author assigned to the at least one section of the document;

displaying the document details metadata in the document details pane;

displaying the section details metadata in the section details pane; and publishing the document, wherein publishing the document includes disabling the line of business integration mode and hiding the document assembly pane.

12. The computer storage media medium of claim 11, wherein the document details metadata includes at least one member of a group comprising: a document description, an assigned editor, a filename, a path, and an abstract.

13. The computer storage media medium of claim 11, wherein the section details metadata includes at least one member of a group comprising: a section title, a section owner, a start date, a due date, a status, authoring instructions, reassignment privileges, view protection, and a notification history.

14. The computer storage media medium of claim 11, wherein the section details pane includes a list of sections and assignments, wherein an expanded section details pane is populated with assignment metadata associated with a selected section.

15. The computer storage media medium of claim 14, wherein the expanded section details pane includes at least one member of a group comprising: a section title, an author, a due date, a status, and an instruction.

16. The computer storage media medium of claim 14, wherein the selection of a section in the section details pane automatically navigates the document editor pane to the selected section in the document.

17. The computer storage media medium of claim 11, wherein the document of the document editor pane and the document assembly pane are automatically updated with author changes during collaborative authoring.

18. The computer storage media medium of claim 11, further comprising a notification pane for sending a notification to an author assigned to a section.

19. The computer storage media medium of claim 11, further comprising a notification pane for sending a notification to an editor indicating that a status of an assigned section is changed.

20. A system for providing collaborative authoring features in a document editor program, the system comprising:

a processor;

a display; and a memory having computer-executable instructions stored thereon, the instructions being configured to:

provide a document editor program that includes a line of business integration mode;

activate the line of business integration mode;

display, on the display, a document editing pane in the document editor program, wherein the document editing pane includes a document having at least one section;

display, on the display, a document assembly pane in the document editing program, wherein the document assembly pane includes a document details pane and a section details pane;

obtain document details metadata, wherein the document details metadata includes metadata associated with collaboratively authoring the document;

obtain section details metadata, wherein the section details metadata includes data associated with an author assigned to the at least one section of the document;

display, on the display, the document details metadata in the document details pane;

display, on the display, the section details metadata in the section details pane; and publish the document, wherein publishing the document includes disabling the line of business integration mode and hiding the document assembly pane.

* * * * *